Patented Jan. 2, 1951

2,536,701

UNITED STATES PATENT OFFICE 2,536,701

ORNAMENTAL PRESERVING COATING FOR FOOD ARTICLES

Bela Sag, Alliance, Ohio

No Drawing. Application September 8, 1948,
Serial No. 48,327

13 Claims. (Cl. 99—166)

The invention relates generally to the application of coatings or wrappers to food products for protecting the same, and more particularly to a method of applying an ornamental coating to an article of food for preserving the original freshness of the food for an indefinite period.

Certain prior methods of coating articles or packages of food, such as cheese or fruit, have included applying a layer of tinfoil and a layer of melted wax or grease. Such a layer of wax or grease is not a suitable outer covering from the standpoint of handling or appearance, and therefore it is desirable to apply an outer wrapper of paper or cellulose to complete the package or article. However, an outer wrapper of this type cannot be applied smoothly to conform to articles of irregular ornamental contour so as to provide an ornamental outer covering conforming closely to the original configuration of the article.

These prior methods of coating food articles are unsatisfactory when applied to chocolate candy and other foods which lose their freshness quickly. For example, if chocolate is coated with a single layer of metal foil and then dipped in hot wax or grease, the foil conducts the heat rapidly to the chocolate and renders the fatty substances in the chocolate rancid, so that the original flavor and freshness of the chocolate is destroyed, regardless of how well the coating thereafter protects or preserves it.

It has been proposed to provide the metal foil with an undercoating such as gelatin, but such an undercoating detracts from the ability of the foil to be molded around an irregular ornamental article of food, and on the other hand, if the undercoating is separately applied to the food article, particles of the undercoating tend to stick to the food when the wrapper is removed.

A principal object of the present invention is to provide a novel process for applying to a food article a coating which has a highly ornamental exterior, and which not only protects the food, but also preserves its original freshness for an indefinite period of time.

Another object is to provide a novel process for applying an ornamental coating to a molded figure of food or edible material.

A further object is to provide a novel method of applying a preserving coating to a molded food article.

Another object is to provide a novel ornamental preserving covering conforming closely to the contour of a molded article of food.

A still further object is to provide an ornamental food preserving coating and method of applying the same to molded food articles, which overcomes the difficulties and disadvantages of prior coatings and methods of applying the same.

These and other objects and advantages apparent to those skilled in the art from the following description and claims, are accomplished by the methods, articles, elements, coatings and combinations of elements and method steps comprising the present invention, the nature of which is set forth in the following general statement, and preferred embodiments of which are set forth in the following description and particularly and distinctly defined in the appended claims forming part hereof.

In general terms, the invention includes molding at least two layers or the equivalent of metal foil around an article of food to retain its outer configuration, then dipping the foil-coated article in a melted fatty substance, cooling the thus coated article rapidly to solidify the same, decorating the article with pigment, preferably again dipping the decorated article in melted fatty substance and cooling rapidly to solidify, and then applying a coating of transparent lacquer.

The novel process of applying an ornamental preserving coating to a food product or article may be applied to a great variety of foods or edible substances, and the invention is particularly applicable to the coating of food products which are first molded or shaped to a particular configuration. Such configuration may be circular or rectangular molded packages of fruit or candy, or the food article may be shaped to represent a particular figure or figurine, as for example, a chocolate article may be molded in the shape of an animal or human figure. For convenience, the invention will be described particularly as applied to a molded figure of chocolate, but it will be understood that the novel process and coating can be applied to a wide variety of foods in various shapes and contours.

In carrying out the invention as applied to a chocolate figure, I first apply at least two layers of metal foil by molding the metal foil around the figure to conform closely to its outer configuration. The metal foil is preferably tinfoil or aluminum foil of the crinkled rather than smooth type, although other foils of other metals which do not affect the chocolate may be used. After the double layer of metal foil is molded and shaped closely around the figure, it is preferably dipped into a bath of a melted fatty substance having a low melting point and which will solidify rapidly when cooled. It is very important to use at least a double layer of metal foil, to retard the conduction of the heat of the bath to the food article, so that the article may be dipped in the bath and quickly withdrawn and cooled without any appreciable amount of heat reaching the chocolate so as to affect its flavor or freshness, as by rendering the cocoa butter or other fatty substances in the chocolate slightly rancid.

While a heavy layer of the metal foil equivalent to two ordinary layers of the metal foil can be used, I prefer to apply separate layers because they can be molded more closely and smoothly around the article, and the two layers are a poorer conductor of heat than a single heavy layer.

The melted bath of fatty substance may be paraffin or stearin or tallow, or a mixture of two or more, or any similar fatty substance which has a low melting point varying between about 104° F. and 124° F., and which solidifies or congeals rapidly when cooled. The temperature of the melted bath of fatty substance should be slightly above the melting point of the substance, and I prefer to use a melted paraffin bath maintained at about 140° F. temperature.

In dipping the figures coated with metal foil, the figure is dipped momentarily in the hot fatty substance, and then immediately withdrawn and submerged in a bath of ice water to solidify the fatty coating quickly without having any effect upon the composition or flavor of the chocolate. The chocolate is thus entirely sealed from the outside atmosphere and the outer contour of the figure is retained.

The coated figure is now ready for decoration with paint or pigment if desired, and is preferably sprayed with a ground coat, which may be titan white or zinc yellow or other similar innocuous and non-toxic painting materials. After the ground coat has dried, non-toxic pigments may be applied with a brush to give the article an ornamental or life-like appearance.

After the article is thus decorated, I prefer to apply a second layer of the paraffin or other fatty substance by again dipping the figure in the bath of melted fatty substance momentarily and then immediately submerging it in ice water or the like to solidify the second coating. Obviously, the fatty substance of paraffin or the like should be transparent or at least translucent when it has solidified so that the decorative coat of pigment will show through the outer fatty coating. If the article does not require any decorative paint or pigment, it may not be necessary to apply the second coating of the melted fatty substance, but I prefer to apply the second coating in most cases to insure the best results, both with respect to preserving the food and obtaining the best ornamental appearance.

After the second coating of melted fatty substance is completely dry, I apply a final liquid coating of a transparent lacquer which dries with a glossy finish simulating a porcelain or china exterior. I prefer to use a clear transparent copal lacquer, and the article may be dipped in the liquid lacquer and then suspended until completely dry. Such a lacquer has the characteristic of drying with a high luster or gloss which gives the finished article an appearance very closely simulating that of genuine china or porcelain, and the appearance is so much like china or porcelain that it is difficult to detect the difference, except by the degree of hardness of the coating.

The thus coated figure will satisfactorily resist temperatures up to 124° F. without any change in appearance, and the outer surface of the article has an ornamental china-like appearance, so that the figures can be made accurately in various ornamental and artistic shapes colored to present a pleasing and attractive appearance. However, when desired, the entire coating may be peeled off the chocolate core or interior merely with the use of the fingernails, and the inner foil layer does not cling or stick to the chocolate, but is easily peeled off like an eggshell. Should a child eat part of the coating by mistake, there is nothing in its ingredients which is injurious.

Chocolate figures coated with the novel coating applied in accordance with the novel process described herein have been found in actual practice to preserve fully the original flavor and freshness of the chocolate for as long as fifteen months, and there is no reason why it should not be preserved for much longer periods. Thus, the novel coating is not only ornamental and adapted to conform to the original configuration of the food article, but also acts as a preserving coating to seal the food from the atmosphere completely and preserve its original freshness, without having any deleterious effect on the food during the novel coating process.

For certain purposes, it may be desirable to omit the final coating of lacquer, in which case the coating will have full preserving quality and will be ornamental but lacking only in the high gloss imparted by the lacquer.

In the foregoing description, certain terms have been used for brevity, clearness and understanding, but no unnecessary limitations are to be implied therefrom beyond the requirements of the prior art, because such words are used for descriptive purposes herein and are intended to be broadly construed. For example, the term "fatty substance" is intended to include any paraffin, stearin, or animal or vegetable fat or grease, or mixture of two or more of the same, which has a melting point of the order of 104° F. to 124° F., and which will solidify quickly on cooling to provide a transparent or translucent coating.

Having now described the invention, including the preferred manner of practicing the novel method to obtain the novel coating, and the new and useful results obtained thereby; the new and useful methods and articles and reasonable mechanical equivalents thereof obvious to those skilled in the art are set forth in the appended claims.

I claim:

1. The method of applying an ornamental preserving coating to an article or package of food including chocolate, which consists in applying at least two layers of crinkled metal foil to the article, then dipping the article in a bath of melted fatty substance having a melting point of about 104° F. to 124° F. and maintained at a maximum temperature of 140° F., cooling rapidly to solidify the fatty coating without affecting the food, decorating the solidified coating, and then applying a liquid coating of transparent lacquer which dries with a high luster simulating a porcelain surface.

2. The method of applying an ornamental preserving coating to chocolate products, which consists in applying at least two layers of crinkled metal foil to the article, then dipping the article in a bath of melted fatty substance having a melting point of about 104° F. to 124° F. and maintained at a maximum temperature of 140° F., cooling rapidly in ice water to solidify the fatty coating, decorating the solidified coating with pigment, and then applying a liquid coating of transparent copal lacquer.

3. The method of applying an ornamental preserving coating to chocolate products, which consists in applying at least two layers of crinkled metal foil to the article, then dipping the article in a bath of melted fatty substance having a melting point below 125° F. and maintained at a maximum temperature of 140° F., cooling rapidly to solidify the fatty coating without affecting the food, decorating the solidified coating, dipping the decorated article into said bath of melted fatty substance, cooling rapidly to solidify said second fatty coating, and then applying a liquid coating of transparent lacquer which dries to give the article an exterior like china.

4. The method of applying an ornamental preserving coating to chocolate products, which consists in molding at least two layers of crinkled metal foil around the article, then applying a coating of melted paraffin to the foil, cooling rapidly in ice water to solidify said coating, decorating the solidified coating with pigment, applying a second coating of said paraffin, cooling the second coating rapidly to solidify the same, and then applying a liquid coating of transparent copal lacquer.

5. The method of applying an ornamental preserving coating to chocolate products, which consists in applying a covering of crinkled metal foil to the article, then applying to the foil a coating of melted fatty substance having a melting point of about 104° F. to 124° F. and maintained at a maximum temperature of 140° F., cooling rapidly to solidify said coating without affecting the food, decorating the solidified coating with pigment, and then applying a liquid coating of transparent lacquer which dries with a glossy china-like exterior surface.

6. An ornamental preserving coating for an article or package of chocolate food including an inner molded layer of crinkled metal foil, an intermediate layer of solidified fatty substance having a melting point below 125° F., a decorative coating of pigment on said intermediate layer and an outer layer of transparent lacquer having a glossy surface simulating china.

7. An ornamental preserving coating for chocolate products including an inner molded double layer of crinkled metal foil, an intermediate layer of solidified fatty substance, a decorative coating of pigment on said solidified coating, and an outer layer of transparent lacquer having a glossy surface simulating china.

8. An ornamental preserving coating for chocolate products molded to a particular contour, including an inner double layer of crinkled metal foil molded around said article, an intermediate layer of solidified fatty substance conforming to said foil and having a decorative coating of pigment, another layer of solidified fatty substance over the pigment, and an outer layer of transparent copal lacquer having a glossy surface simulating china.

9. An ornamental preserving coating for an article or package of chocolate food including an inner molded layer of crinkled metal foil, an intermediate layer of paraffin having a melting point below 125° F., a decorative coating of pigment on said intermediate layer and an outer layer of transparent copal lacquer.

10. The method of applying an ornamental preserving coating to chocolate products, which consists of applying a covering of crinkled metal foil to the article, then applying to the foil a coating of melted fatty substance having a melting point of about 104° F. to 124° F. and maintained at a maximum temperature of 140° F., cooling rapidly to solidify the coating without affecting the food, decorating the solidified coating with titan white pigment, and then applying a liquid coating of transparent lacquer which dries with a glossy china-like exterior surface.

11. The method of applying an ornamental preserving coating to chocolate products, which consists of applying a covering of crinkled metal foil to the article, then applying to the foil a coating of melted fatty substance having a melting point of about 104° F. to 124° F. and maintained at a maximum temperature of 140° F., cooling rapidly to solidify the coating without affecting the food, decorating the solidified coating with zinc yellow pigment, and then applying a liquid coating of transparent lacquer which dries with a glossy china-like exterior surface.

12. An ornamental preserving coating for chocolate products including an inner molded layer of crinkled metal foil, an intermediate layer of paraffin having a melting point between 104° F. and 124° F., a decorative coating of titan white pigment on said paraffin, and an outer layer of transparent copal lacquer.

13. An ornamental preserving coating for chocolate products including an inner molded layer of crinkled metal foil, an intermediate layer of paraffin having a melting point between 104° F. and 124° F., a decorative coating of zinc yellow pigment on said paraffin, and an outer layer of transparent copal lacquer.

BELA SAG.

REFERENCES CITED

The following references are of record in the file of this patent:

UNITED STATES PATENTS

| Number | Name | Date |
| --- | --- | --- |
| 45,762 | Staunton | Jan. 3, 1863 |
| 1,399,270 | Nusbaum | Dec. 6, 1921 |

FOREIGN PATENTS

| Number | Country | Date |
| --- | --- | --- |
| 14,692 | Great Britain | Jan. 1888 |

OTHER REFERENCES

The Condensed Chemical Dictionary, 3rd Ed., p. 205, Reinhold Publishing Corp., N. Y., 1942.